United States Patent [19]

Cartwright

[11] 3,733,680
[45] May 22, 1973

[54] METHOD OF AND APPARATUS FOR ASSEMBLING INTERNESTING MEMBERS

[75] Inventor: William J. Cartwright, Palos Park, Ill.

[73] Assignee: Continental Can Company, Inc., New York, N.Y.

[22] Filed: Mar. 17, 1971

[21] Appl. No.: 125,048

[52] U.S. Cl. .................................29/429, 29/208 B
[51] Int. Cl. ........................B23p 19/00, B23p 19/04
[58] Field of Search ................29/429, 208 B, 203 V, 29/DIG. 44, 208 D, 211 R

[56] References Cited

UNITED STATES PATENTS 3,360,843 1/1968 Pearson ..............................29/208 B
3,579,785 5/1971 Hellborg .........................29/208 B X Primary Examiner—Thomas H. Eager
Attorney—Diller, Brown, Ramik & Holt

[57] ABSTRACT

This disclosure relates to an automatic mechanism for assembling plastic bottles or liners within containers, the mechanism including holders which are mounted for movement about an endless path and there being associated with the holders means for serially positioning containers in the lower portions of the holders and means for simultaneously placing a plurality of plastic bottles in the upper portions of the holders, and in the area of the positioning of bottles within the holders, there being vacuum means to retain the bottles in elevated positions above the containers temporarily and then to serially release the bottles and permit them to be positioned within the respective containers.

20 Claims, 6 Drawing Figures

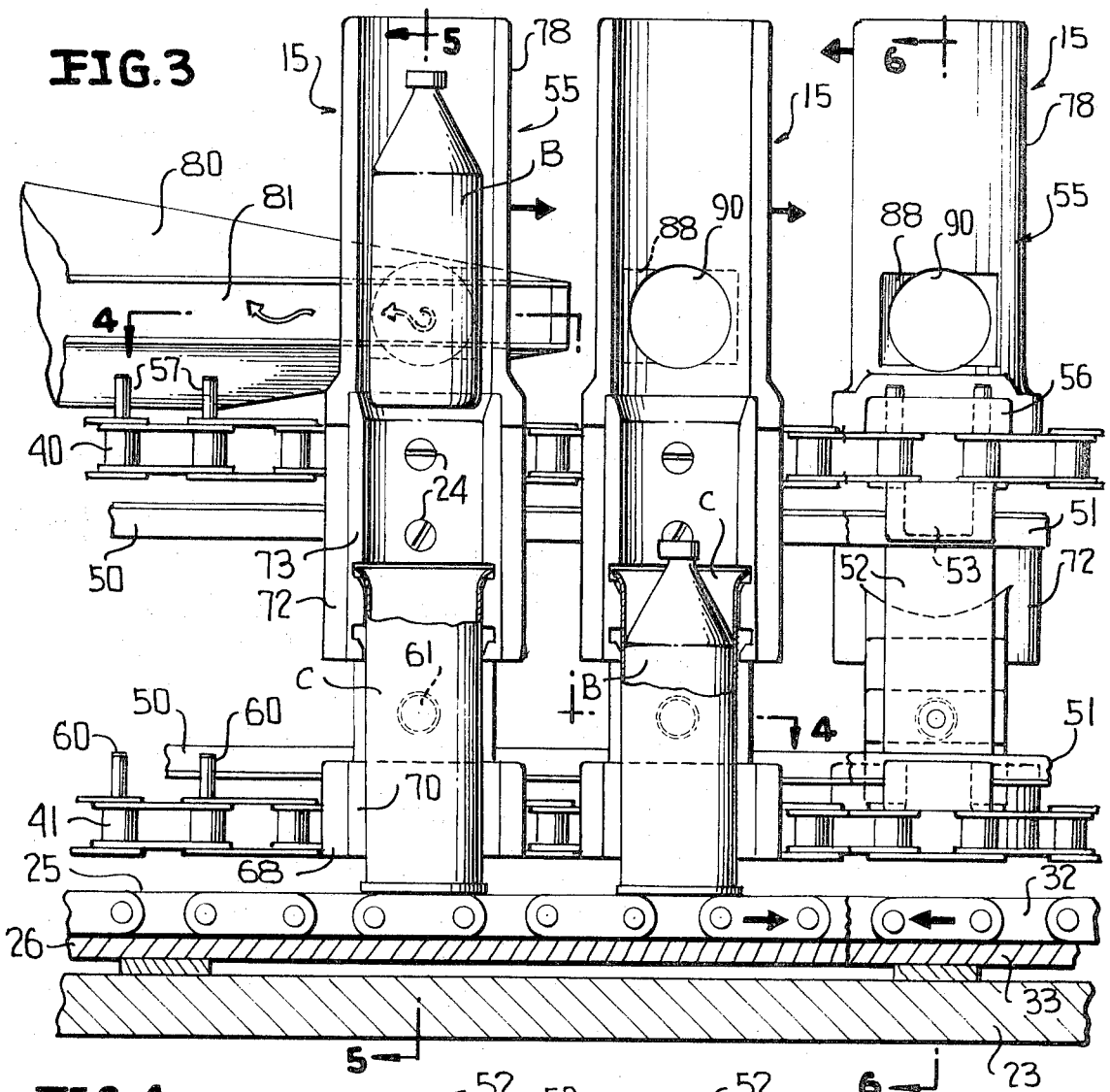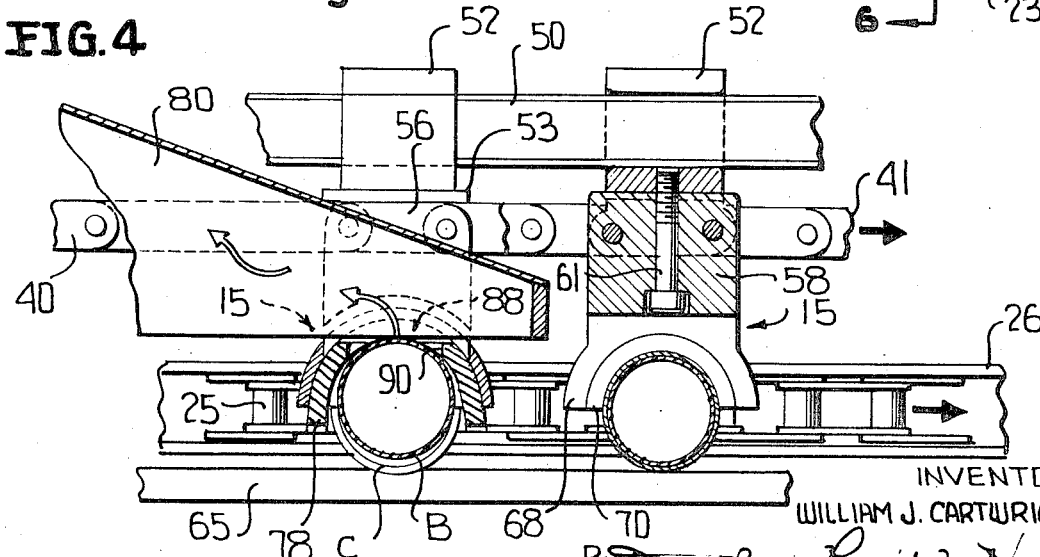

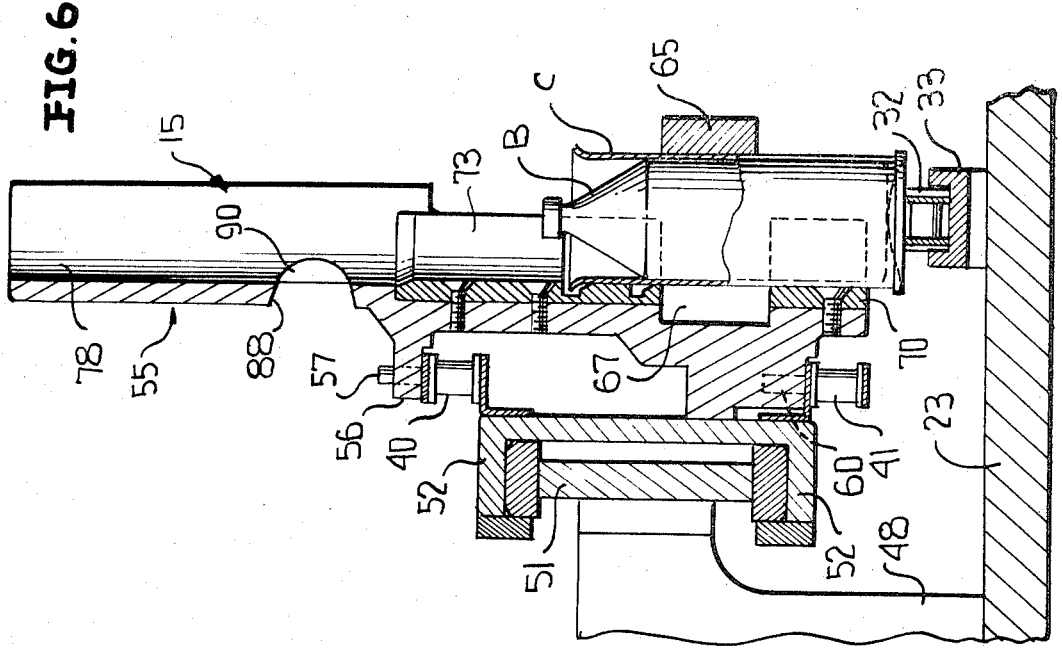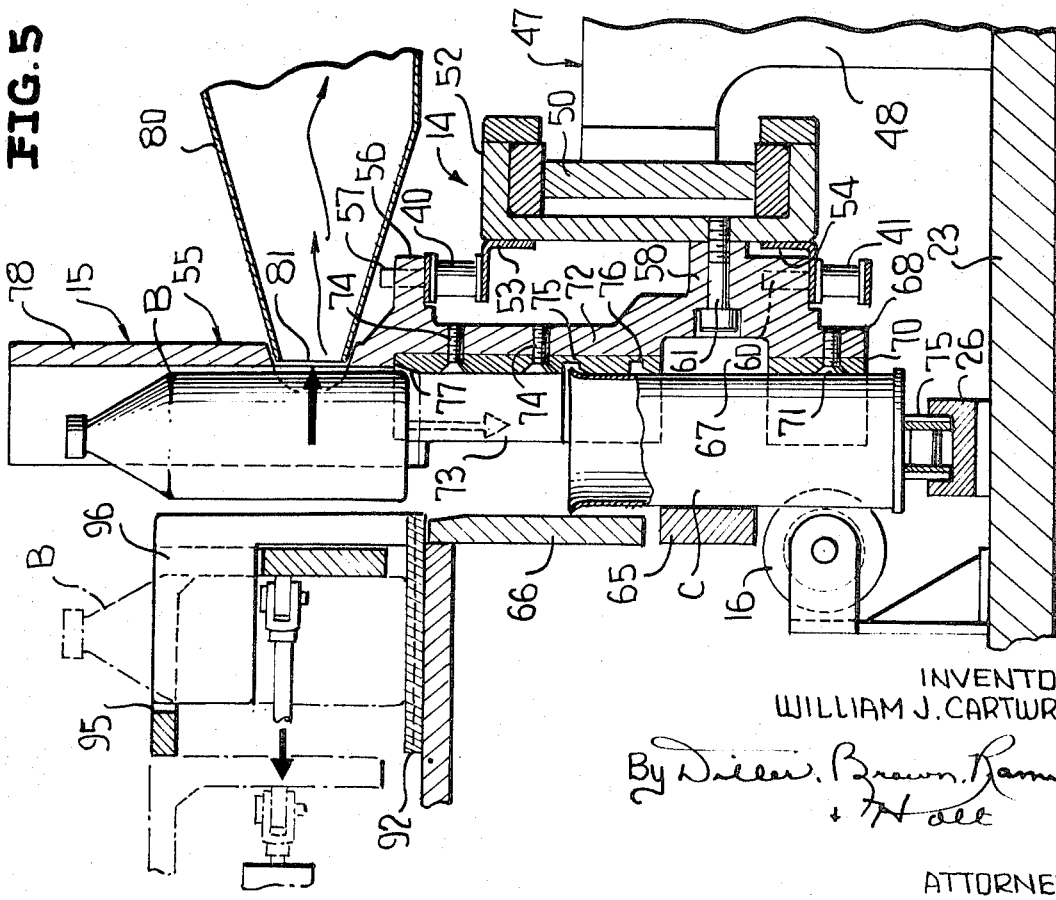

3,733,680

METHOD OF AND APPARATUS FOR ASSEMBLING INTERNESTING MEMBERS

This invention relates in general to new and useful improvements in container manufacture, and more particularly to a novel method and apparatus for assembling plastic liners or bottles with containers automatically.

BACKGROUND OF THE INVENTION

In accordance with this invention, it is desired to assemble a plurality of sets of members in internested relation. Particularly, it is desired to place plastic liners or bottles within can bodies in the formation of aerosol containers.

It is well known to singularly position and drop containers, one within the other. However, difficulties have been encountered in maintaining the alignment of the containers to be assembled. Furthermore, when containers are singularly applied, the speed of operation is necessarily relatively slow.

In recent years there have been developed bottle orienting machines which receive a plurality of bottles in random relationship and orient the bottles. These machines present a plurality of bottles upon each delivery or ejection operation thereof and the bottles are simultaneously received in a suitable conveyor. In the past, the bottles have been presented to washing or filling mechanisms in the normal course of a filling operation.

SUMMARY OF THE INVENTION

In accordance with this invention, it is proposed to utilize the prior developed bottle orienting mechanism to orient plastic bottles or liners for aerosol containers and to simultaneously deliver a large number, on the order of 10, of such liners or bottles to an assembling mechanism with the delivered bottles or liners being so retained and so guided as to be telescoped within associated can bodies.

In order that the delivered plastic bottles or liners may be held in position for reception within the can bodies at least until the bottle positioning mechanism has retracted, it is proposed to provide vertically elongated guides or holders which have received in the lower portions thereof can bodies and which receive in upper portions thereof plastic bottles or liners. The holders have associated therewith vacuum means for holding the plastic bottles or liners in the upper portions thereof. After the bottles have been deposited within the holders and the positioning means therefor has been retracted, the vacuum means may be rendered inoperative and the bottles may be permitted to descend by gravity, while being guided, into the can bodies.

A further feature of the invention is the fact that the holders are mounted for continuous movement along an endless path. This permits the continuous assembling of plastic liners or bottles with can bodies notwithstanding the periodic positioning of bottles or liners within the holders.

The mounting of the holders for continuous movement along an endless path also permits the serial releasing of the vacuum holding the bottles or liners in the upper portions of holders and allows the use of a novel vacuum system. In accordance with this invention, the vacuum system includes an elongated duct which is disposed along the path of movement of the holders and is in alignment with the mechanism which positions the bottles or liners within the holders, and the holders are provided with vacuum ports alignable with the ducts and substantially sealable therewith, and the vacuum system being rendered inoperative with respect to each holder sequentially as the holder moves past the end of the duct.

A further feature of the invention is the formation of the holders wherein a plurality of can bodies of different heights may be accommodated within the mechanism without modification of the mechanism and liners or bottles of the proper height for the particular can body can be also accommodated within the machine without any modification thereto.

With the above and other objects in view that will hereinafter appear, the nature of the invention will be more clearly understood by reference to the following detailed description, the appended claims and the several views illustrated in the accompanying drawings:

IN THE DRAWINGS

FIG. 3 is a fragmentary elevational view taken along the line 3—3 of FIG. 1 and shows generally the details of the holders and the relationship thereof to the vacuum duct.

FIG. 4 is a fragmentary horizontal sectional view taken along the line 4—4 of FIG. 3 and shows further the details of the holder and the association thereof with the vacuum duct.

FIG. 5 is a fragmentary vertical sectional view taken along the line 5—5 of FIG. 3 and shows the details of the positioning of bottles within the upper portions of the holders and the retention of such bottles in the holders by the vacuum means.

FIG. 6 is a fragmentary vertical sectional view taken along the line 6—6 of FIG. 3 and shows further the details of the holders and the mounting thereof.

Figure 1:
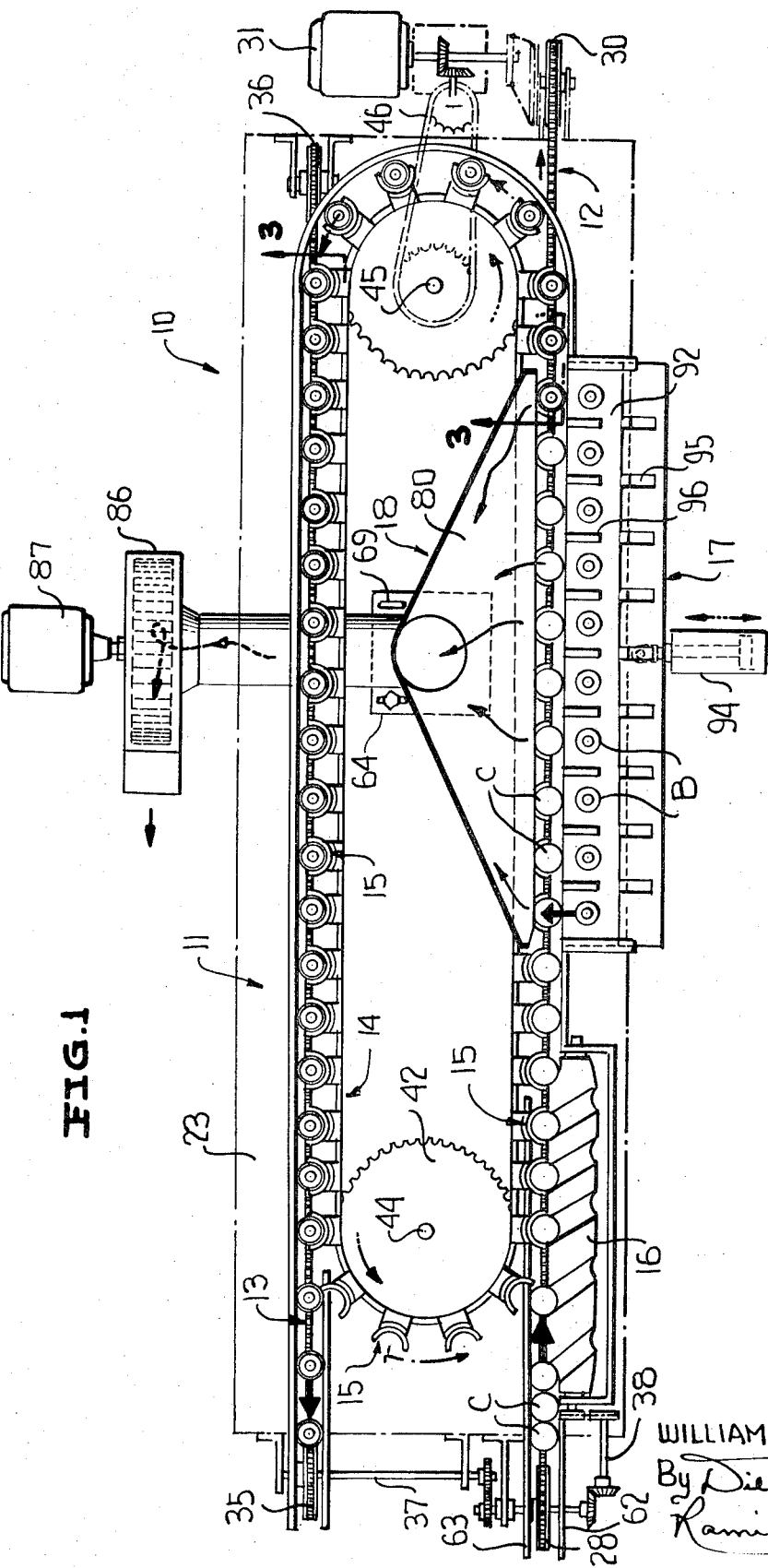
FIG. 1 is a schematic plan view of the mechanism and shows the general details of the various components thereof, the vacuum pump being displaced from its proper position for purposes of clarity.

Referring now to the drawings in detail, it will be seen that there is illustrated in FIG. 1 the over-all layout of the apparatus, which apparatus is generally identified by the numeral 10. The apparatus 10 includes a base 11 from which the various components are supported. Can bodies C are supplied to the apparatus 10 in a conventional manner and are conveyed down one side of the apparatus 10 by means of an infeed conveyor which is generally identified by the numeral 12. Assembled can bodies and liners are delivered from the apparatus 10 by an outfeed conveyor, generally identified by the numeral 13, which extends down the opposite side of the apparatus.

An endless holder assembly, generally identified by the numeral 14, is mounted so as to have two runs thereof generally in alignment with the infeed conveyor 12 and the outfeed conveyor 13. The holder assembly 14 includes a plurality of individual holders each of which is identified by the numeral 15.

In accordance with this invention, the can bodies C are serially fed into the holders 15 by means of a feed screw 16. A supply system for liners or bottles includes a pusher assembly, generally identified by the numeral 17, which simultaneously places a large number, for example 10, of liners or bottles B into upper portions of the holders 15 above the can bodies C. This is accomplished while the holder assembly 14 is constantly moving.

The liners or bottles B are held in the upper portions of their respective holders 15 by a vacuum system, generally identified by the numeral 18 and as the holders 15 move away from the vacuum system 18, the liners or bottles B are serially released and they fall by gravity into their respective can bodies C.

Figure 2:
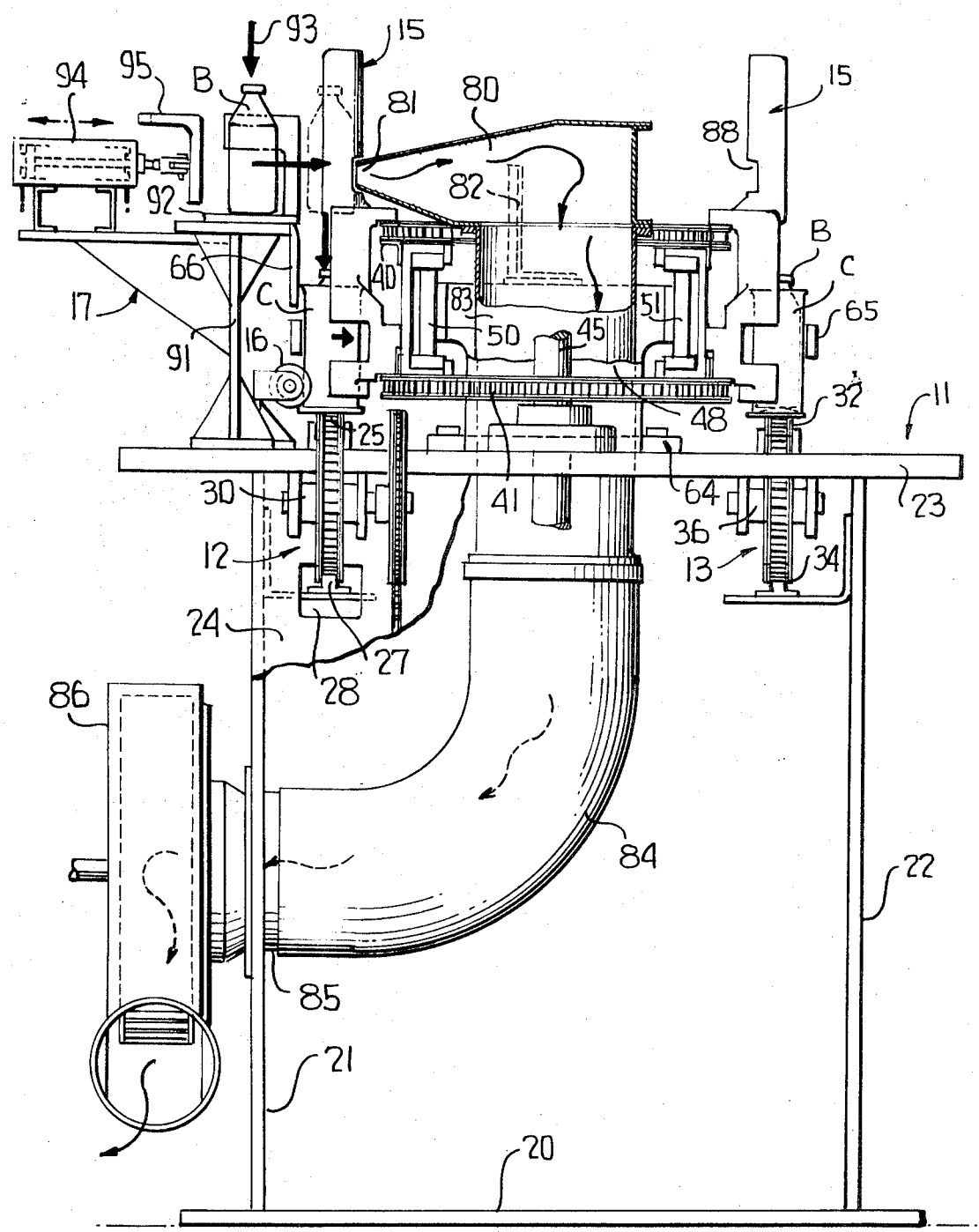
FIG. 2 is an enlarged end view of the apparatus with parts broken away and shows generally the details of the apparatus.

Having broadly described the invention, reference is now made to the specific details thereof, many of which are clearly illustrated in FIG. 2.

The frame or base 11, includes a base plate 20 which may be suitable seated on a supporting structure, such a building floor. The base 11, among other structural details, includes front and rear upstanding plates 21 and 22. These, in turn, support a table 23. The frame 11 further includes end panels of which only an end panel 24 is specifically illustrated.

The infeed conveyor 12 lies in a vertical plane and includes an upper run 25 which is disposed above the plane of the table 23 and runs in a suitable guide 26 carried by the table 23. The infeed conveyor 12 also includes a lower run 27 which primarily runs within the frame 11 below the table 23 and enters into and exits through openings in the end panels, the illustrated opening in the end panel 24 being identified by the numeral 28.

With particular reference to FIG. 1, it will be seen that the infeed conveyor 12 is carried by a pair of sprockets 28 and 30 which are suitably mounted. The infeed conveyor 12 may be driven in any manner. However, in the schematic illustration of FIG. 1 the sprocket 30 is illustrated as being the driven sprocket and is coupled to an electric motor 31 for the apparatus 10.

The details of the outfeed conveyor 13 are very similar to those of the infeed conveyor 12 and includes an upper run 32 which is disposed above the table 23 and, as is best illustrated in FIG. 6, rides in a suitable guide 33 carried by the table 23. The outfeed conveyor 13 also includes a lower run 34 which is disposed below the table 23 and runs primarily within the interior of the frame 11 and passes through suitable openings (not shown) similar to the openings 28 in the respective end panels.

Referring once again to FIG. 1, it will be seen that the outfeed conveyor 13 includes sprockets 35 and 36 disposed at opposite ends of the frame 11. For purposes of illustration, the sprocket 35 is a driven sprocket and is suitably connected to the sprocket 28 for rotation in unison therewith by means of a suitable drive train 37 which may be of any constructional detail.

At this time it is also pointed out that the feed screw 16 is illustrated as being driven from the sprocket 28 by means of a suitable drive train 38 which also may be of any suitable constructional detail. Thus, the flow of can bodies C into and out of the apparatus 10 is synchronized.

The numerous holders 15 of the holder assembly 14 are interconnected in uniformly spaced relation by a pair of endless conveyor chains 40,41. The conveyor chains 40,41 each lies in a horizontal plane and is entrained over a pair of horizontally disposed sprockets 42,43 disposed in overlying relation with respect to the table 23 and adjacent to the opposite ends thereof. The sprockets 42 are idler sprockets and are mounted on a common shaft 44. The sprockets 43 are driven sprockets and are carried by a driven shaft 45 which is suitably driven from the electric motor 31 by means of a drive train 46 which may be of any desired construction. It is to be understood that the endless conveyor assembly 14 and the outfeed conveyor 13 are to be driven at the same linear rate as the final lead on feed screw 16. The infeed conveyor 12 is to be driven at a slightly higher speed than the final lead of feed screw 16.

Inasmuch as the holders 15 are fully supported by the chains 40,41, it is necessary that the chains 40,41 be supported and guided in between the sprockets 42,43. To this end, there is provided a conveyor chain guide assembly which is generally identified by the numeral 47 and which is best illustrated in FIGS. 5 and 6. The guide assembly 47 includes suitable supports 48 which are carried by and which extend upwardly from the table 23. There is at least two of the supports 48 and the supports 48, in turn, fixedly mount longitudinally extending guides 50,51 which are spaced above the table 23 and run parallel to the infeed conveyor 12 and the outfeed conveyor 13, respectively. The guide 50 guides the chains 40,41 while they associate with the infeed conveyor 12 and the guide 51 guides the chains 40,41 while they are associated with the outfeed conveyor 13.

The guides 50,51 have associated therewith sliding guide elements 52 to which link extensions 53 and 54 of the chains 40,41 are fixedly secured in any desired manner. It is to be noted that the guides 50,51 are generally I-shaped in cross section while the guide elements 52 are generally C-shaped in cross section and interlock with the guides 50,51 so as to position the chains 40,41 both vertically and horizontally.

Each holder 15 is formed primarily in the form of a casting or housing member 55. The housing member 55 is formed on the rear side thereof intermediate its upper and lower ends with a projecting lug which is vertically apertured to receive a pair of upstanding pins 57 carried by an associated link of the upper conveyor chain 40.

Each housing member 55 is also provided on the rear surface thereof adjacent the bottom thereof with a relatively large lug 58 of which the lower portion is apertured and receives a pair of pins 60 of an underlying link of the chain 41. It thus will be seen that a holder 15 may be associated with the chains 40,41 by merely setting the holder 15 in position. In order to assure the connection between each holder 15, the chains 41,42 and the respective guide element 52, the upper part of the lug 58 is provided with at least one fastener 61 which is threadedly engaged with the respective guide element 52.

As was previously described, the apparatus 10 is particularly configurated for assembling plastic bottles or liners in can bodies. As the can bodies C approach the apparatus 10, they are guided by suitable guides 62,63 with the guide 62 terminating at the feed screw 16 and the guide 63 terminating at the discharge end of feed screw 16. After the can bodies C have been seated within the respective holders 15 by the feed screw 16, they are retained in guided relation by suitable outer guides such as guides 65 and 66 which may be continuations of the guide 62. At this time it is pointed out that the configuration of the holder member 55 is such so as to provide a recess 67 in front of the lug portion 58 so as to permit the guide 63 to be disposed between the rear portion of a holder 15 and the can body C as it is disposed therein by the feed screw 16. The guide 66 has a further function which will be described hereinafter.

It is to be noted that the can bodies C are seated on the upper run 25 of the infeed conveyor 12 and are thus supported and carried thereby although they are positioned within their respective holders 15. The same is true with respect to the can bodies as they pass along the rear portion of the apparatus 10 except that they are supported by the upper run 32 of the outfeed conveyor 13.

It is to be particularly noted from FIGS. 5 and 6 that the housing member 55 is of a configuration wherein it may be readily modified to receive can bodies of different sizes, particularly can bodies of different heights. To this end, the extreme lower part of the holder member 55, which lower part is identified by the numeral 68, is of a semi-cylindrical configuration and has removably seated therein an insert 70 which is also of a semi-cylindrical configuration. The insert 70 is removably secured in the lower portion 68 by means of a fastener 71, as is best shown in FIG. 5.

It is to be noted that the insert 70 is positioned below the recess 67 and is at an elevation with respect to the upper run 25 of the infeed conveyor 12 so as to engage the lower portion of any container which may be seated on the upper run 25.

At this time it is pointed out that guides 62, 63, 65 and feed screw 16 are vertically adjustable for different height containers or can bodies C which are to be received within the holder 15. The cooperation of the guide 65 together with the insert 70 will be sufficient to maintain the position of a very short container within the respective holder 15.

It is also pointed out at this time that in the event the upper end of the container into which an element is to be inserted is positioned so that it would normally engage the guide 63, the guide 63 may be inverted so that it will engage the container below the outwardly flanged upper end thereof.

The apparatus 10, as illustrated in the drawings, is particularly adapted to receive, without modification, can bodies of three different heights. As indicated above, if the can body is very short, the outwardly flanged upper end thereof will be received within the recess 67. If the can body is taller, the upper end thereof will be aligned with an intermediate portion 72 of the holder member 55, which intermediate portion 72 is also of a cylindrical configuration and has seated therein an insert 73. The insert 73 is removably secured in place in the intermediate portion 72 by means of a pair of fasteners 74. It is to be understood that the internal curvature of the insert 73 will generally correspond to that of the insert 70 and will be in accordance with the diameter of the can body for which the apparatus 10 is particularly adapted to receive.

In order that full support of the upper part of the can body disposed within a holder 15 may be effected, the exposed surface of the insert 73 is notched as at 75 and 76. The uppermost notch 75 is disposed at an elevation to receive the flanged upper end of a can body of a predetermined height and the lower notch 76 is also of a height to receive the outwardly directed flange of a can body of a lesser height.

It will also be readily apparent that each holder 15 could be readily adapted to receive can bodies of other heights. When it is desired to adapt the apparatus 10 to receive can bodies of heights greater than the can body C illustrated in FIG. 5, the insert 73 is replaced by a similar insert, but wherein notches are formed therein at elevations corresponding to the heights of the can bodies to be received within the holders 15.

It is also to be noted that the extreme upper part of the insert 73 is provided with a tapered configuration as at 77 to facilitate the centering of a plastic bottle B with the underlying can body C. Thus, the can bodies C, since they are properly supported by the holders 15, are ready to receive the bottles B once they are positioned within the upper portion of each holder and at least for dropping into the associated can body.

The holder member 55 further includes an upper portion 78 which is also of a semi-cylindrical configuration. The upper portion 78 is not provided with an insert although it would be feasible to do so if it is so desired. However, because the bottle B can be guided in its downward descent, it is not necessary that the bottle be exactly aligned with the can body when received within the upper portion of its respective holder 15.

It is to be understood that the vacuum system 18 serves to temporarily retain a bottle B or like element within the upper portion 78 of each holder 15. To this end, the vacuum system 18 includes an elongated duct 80 which is provided with a narrow mouth 81 which opposes the back of the holders 15 as they move along the front portion of the apparatus 10.

As is clearly shown in FIGS. 1 and 2, the duct 80 is of a triangular outline in plan and generally of a trapezoidal cross section in elevation. The duct 80 may be fixedly mounted within the apparatus 10 in any desired manner although in FIG. 2 the duct 80 has been illustrated as being specifically carried by the supports 48 by means of suitable mounting brackets 82.

The central rear part of the duct 80 has a conduit 83 secured to the underside thereof and extending downwardly therefrom. The conduit 83 passes through a suitable opening in the table 23 and below the table 23 has connected thereto an elbow or curved conduit 84. The elbow 84, in turn, is connected to a fitting 85 which extends through and is carried by the front panel 21 with the fitting 85 being connected to a suction fan or pump 86 mounted at the front of the apparatus 10. As is schematically illustrated in FIG. 1, the suction pump or fan 86 is driven by an electric motor 87. The duct 80 is fixed through conduit 83 to a flange 64 (FIG. 1) by means of which it is mounted to the table 33. Adjusting slots in the flange 64 allow the mouth 81 of duct 80 to be positioned with respect to the inner surface of holder 15, the position of which will change for different bottle diameters. Support brackets 82, adjustable with respect to apparatus 10, at either end of duct 80 maintain alignment of duct mouth 81 with the path of holder 15.

It is to be understood that during the operation of the apparatus 10, the motor 87 runs continuously so that a continuous vacuum or suction is drawn within the duct 80. The suction or pump or fan 86 will be of such a capacity that even though portions of the mouth 81 of the duct 80 are not covered by the respective holders 15, sufficient suction or vacuum will be drawn in the upper portion of each holder 78 associated with the mouth 81 of the duct 80 so as to at least temporarily retain a plastic bottle B within the upper portion 78 of the holder member 55.

Referring once again to FIGS. 5 and 6, it will be seen that the rear surface of the upper portions 78 of each holder member 55 is provided with a horizontal notch 88. The notch 88 conforms in vertical extent and vertical cross section to the mouth portion 81 of the duct 80. Thus, as is clearly shown in FIG. 5, when a holder 15 moves in front of the duct 80, the mouth 81 of the duct 80 is received within the notch 80 in substantially sealed relation relative thereto although there is, of course, a certain degree of clearance in that it would be undesirable to have the holders rub against the duct 80.

Because the upper portion 78 of each holder member 55 is semi-cylindrical in configuration, the notch 88 appears to be rectangular in elevation, as is clearly shown in the right-hand holder member 55 of FIG. 3. The notch 88 extends entirely through upper portion 78 only in the extreme central portion of the upper portion 78. In order that a suitable vacuum may be drawn within the interior of the upper portion 78 of each holder member, each holder member is further provided with a circular cutout defining a vacuum port 90. The circular cutout 90, as is best illustrated in FIG. 3, is centered relative to the notch 88 and is in full communication with the interior of the duct 80.

It is to be noted that the vacuum port 90 is positioned so as to engage the lower portion of a plastic bottle B positioned within the upper portion 78 of the holder member 55. Thus, even if the plastic bottle B or other member to be inserted within a can body is relatively short, it will still be in overlying relation with respect to the vacuum port 90 and will be retained in place within the respective holder 15 by the suction effect.

It is also to be understood that inasmuch as the holders 15 do not have closed upper ends, the bottles B may be of any suitable height to correspond with the can bodies C mounted within the lower part of the respective holder.

As is schematically illustrated in FIG. 1, the apparatus 10 is particularly adapted to have a plurality of bottles or other articles simultaneously pushed into the upper portions 78 of the holders 15. In FIG. 2 there has been specifically illustrated the mechanism for pushing the bottles B into place. This mechanism, previously identified by the numeral 17, has been illustrated as including a support structure 91 carried by the table 23 with the support structure 91, in turn, carrying a suitable base 92 on which bottles B adapted to be pushed into the holders 15 are temporarily seated. The manner in which the bottles B are placed upon the base 92 plays no part in this invention. However, it is to be understood that it is preferable that there be associated with the apparatus 10 a bottle orienting mechanism which has a number of orienting lines corresponding to the number of bottles to be simultaneously pushed into the holders 15. The bottle orienting mechanism, which may be of any conventional type, will vertically deposit the bottles B, between vertical side guides 96, onto the base 92 as indicated by the arrow 93. The bottles, when seated on the base 92, will be spaced apart a distance corresponding to the spacing of the holders 15.

The means for positioning the bottles within the holders 15 have also been illustrated as including a double acting fluid motor 94 which is connected to a pusher 95 which may be mounted and guided for horizontal reciprocatory movement in any manner. The pusher 95 may be suitably notched to clear the guides 96. It is to be noted that the pusher 95 is of sufficient vertical extent and has the lower part thereof sufficiently low so as to be capable of pushing bottles of various heights into the holders 15. Thus, no modification of the pusher 95 will normally be required in conjunction with a change in bottle height.

No means have been illustrated or described specifically for the synchronization of the actuation of the pusher 95 with the movement of the holders 15. It is to be understood, however, that the actuation of the pusher 95 will be in timed relation to the operation of the remainder of the bottle orienter (not shown) and that the bottle orienter will be driven in timed relation to the operation of the apparatus 10. Referring once again to FIG. 1, it will be seen that the bottles B will be positioned on the base 92 in advance of the alignment of a like number of holders with the bottles. As the first holder having an empty upper portion approaches the last or right-hand one of the bottles B, as viewed in FIG. 1, the pusher 95 will start its inward movement and the movement thereof will be timed such that the bottles may be fully inserted into the holders 15.

It will be readily apparent that after a large number of bottles have been simultaneously placed in the upper portion of a like number of holders, the pusher 95 will retract and ample time will be provided for the positioning of a second like number of bottles on the base 92. Inasmuch as the holders already have serially disposed in the lower portions thereof can bodies C, it will be apparent that the can bodies are now ready to receive the bottles. As each holder passes beyond the right end of the duct 80, the vacuums to the respective holder will be discontinued and the bottle positioned within the upper portion of the holder will now be free to fall by gravity into the underlying can body. It will be readily apparent that as the can body and bottle travel around the apparatus 10, the bottle will normally be fully seated within the can body. If not, suitable means (not shown) may be provided for mechanically forcing the bottle into a fully seated position within the can body.

It will also be readily apparent that while it is necessary that the holders 15 move around an endless path, where desired, the can bodies may move along a straightline path with the infeed conveyor 12 also functioning as an outfeed conveyor whereby the outfeed conveyor 13 may be eliminated.

Although only a preferred embodiment of the invention has been specifically illustrated and described herein, it is to be understood that minor variations may be made in the apparatus without departing from the spirit and scope of the invention, as defined by the appended claims.

It will also be readily apparent that while it is necessary that the holders 15 move around an endless path, where desired, the can bodies may move along a straightline path with the infeed conveyor 12 also functioning as an outfeed conveyor whereby the outfeed conveyor 13 may be eliminated.

Although only a preferred embodiment of the invention has been specifically illustrated and described herein, it is to be understood that minor variations may be made in the apparatus without departing from the spirit and scope of the invention, as defined by the appended claims.

I claim:

1. Apparatus for assembling internesting members comprising an upright holder, first feed means for feeding a first member into the lower portion of said holder, second feed means for feeding a second member into the upper portion of said holder, vacuum means associated with said holder upper portion for retaining a second member within said holder, and means for rendering said vacuum means inoperative thereby to release a second member to move under the influence of gravity into internested relation.

2. The apparatus of claim 1 wherein said vacuum means includes a fixed vacuum duct, and said means for rendering said vacuum means inoperative includes means for moving said holder out of association with said vacuum duct.

3. The apparatus of claim 2 wherein said vacuum means also includes a vacuum port through said holder upper portion for the direct application of a vacuum holding force from said vacuum duct to a second member positioned within said holder upper portion.

4. The apparatus of claim 1 wherein there are a plurality of said holders and said second feed means are operable to simultaneously feed a plurality of second members to a like number of holders.

5. The apparatus of claim 4 wherein said vacuum means includes a fixed vacuum duct elongated in the direction of holder alignment and generally opposing said second feed means for simultaneously holding a plurality of simultaneously applied second members in said holders.

6. The apparatus of claim 5 wherein said means for rendering said vacuum means inoperative includes the interconnecting of said holders, and means for moving said holders sequentially past said vacuum duct.

7. The apparatus of claim 4 wherein said first feed means includes means for serially feeding first members into said holders.

8. The apparatus of claim 1 wherein there are a plurality of said holders, means interconnecting said holders about a predetermined path, said first feed means including means for serially moving first members into said holders, and said second feed means includes means for simultaneously moving a plurality of second members into said holders.

9. The apparatus of claim 8 wherein said holders are continuously moving along said path and said first and second feed means are operable during said holder movement.

10. The apparatus of claim 8 wherein said vacuum means includes an elongated fixed duct extending along a portion of said path, and each holder having a vacuum port alignable with said duct, and said means for rendering said vacuum means inoperable being said means mounting said holder for movement past said duct.

11. The apparatus of claim 10 wherein each holder has a back wall opposing said duct when moving along said path portion, said back wall being recessed in alignment with said duct to provide an interengagement relationship between each holder and said duct, and said vacuum port opening through said holder in said recess whereby a drawing of a vacuum through each holder when aligned with said duct is assured.

12. The apparatus of claim 8 wherein the configuration of said holders is one particularly adapted to receive a first member in the form of a container body having an open upper end and a second member in the form of a liner for the container body.

13. The apparatus of claim 12 wherein said holder lower portion is configured for receiving container bodies of preselected different heights, and said vacuum port is elevated sufficiently to receive liners above the tallest container body for which said apparatus is designed whereby said apparatus may be utilized to assemble corresponding liners and container bodies of different heights without modification.

14. The apparatus of claim 15 wherein said holders are particularly configured for receiving can bodies having outwardly flanged upper edges, and each holder lower portion is notched to receive flanges of can bodies of different preselected heights.

15. The apparatus of claim 8 wherein each of said holders is vertically elongated with said lower portion being of a height to receive a maximum height first member and there being associated with said holders lower support means whereby first members of varying heights may equally as well be received within said holders, said vacuum means being disposed along a lower part of each holder upper portion whereby second members of varying heights may equally as well be received within said holders.

16. The apparatus of claim 15 wherein there are guide means disposed generally between holder upper and lower portions for automatically guiding second members, when released by said vacuum means, into predetermined internested relation with underlying first members.

17. A method of assembling liners of the type including plastic bottles with can bodies comprising the steps of serially feeding can bodies along a predetermined path, simultaneously positioning a plurality of liners into overlying relation above said moving can bodies, holding said liners above said can bodies and moving said liners together with said can bodies along said path, and then serially lowering said liners into respective can bodies.

18. The method of claim 17 wherein said liners are supported by vacuum means and lowered by separately rendering said vacuum means inoperative with respect to each liner.

19. The method of claim 17 wherein associated can bodies and liners are conveyed by common means.

20. The method of claim 17 wherein associated can bodies and liners are conveyed by common means, and said vacuum means are rendered inoperative in response to certain movement of said common means.

* * * * *